United States Patent
Almalki

(12) 
(10) Patent No.: US 9,183,747 B2
(45) Date of Patent: *Nov. 10, 2015

(54) WARNING APPLICATION SYSTEMS FOR VEHICLE MOVEMENT ACTIVATED ELECTRICAL POWER GENERATOR, AND METHOD FOR PROVIDING ELECTRICAL POWER

(71) Applicant: Bader A. Almalki, Mankato, MN (US)

(72) Inventor: Bader A. Almalki, Mankato, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/073,315

(22) Filed: Nov. 6, 2013

(65) Prior Publication Data

US 2015/0123817 A1    May 7, 2015

(51) Int. Cl.
| | |
|---|---|
| *G08G 1/095* | (2006.01) |
| *G08G 1/00* | (2006.01) |
| *F03D 9/00* | (2006.01) |
| *B60K 16/00* | (2006.01) |
| *G08G 1/0967* | (2006.01) |
| *H02P 9/04* | (2006.01) |
| *F03D 11/04* | (2006.01) |
| *H02J 7/32* | (2006.01) |
| *G05F 1/66* | (2006.01) |
| *H05B 33/08* | (2006.01) |

(52) U.S. Cl.
CPC ............ *G08G 1/096783* (2013.01); *F03D 9/00* (2013.01); *F03D 9/002* (2013.01); *F03D 11/04* (2013.01); *G05F 1/66* (2013.01);
(Continued)

(58) Field of Classification Search
CPC ............... F05B 2240/9113; F05B 2240/40; Y02B 20/72; Y02E 10/725; Y02E 10/728; G05B 2219/2619; G05B 23/0267; F03D 11/04; F03D 9/002; G08G 1/09675; G08G 1/096783; B60K 2016/006; B60L 8/006

USPC .......... 340/907, 966, 963; 290/44, 43, 54, 55, 290/1 R; 415/121.3, 2.1, 4.2, 7; 416/7, 11, 1
See application file for complete search history.

(56) References Cited

U.S. PATENT DOCUMENTS

| | | | |
|---|---|---|---|
| 1,950,993 | A | 3/1934 | Mulvey |
| 3,885,163 | A | 5/1975 | Toberman |

(Continued)

FOREIGN PATENT DOCUMENTS

| | | | |
|---|---|---|---|
| EP | 2 065 596 A1 | | 6/2009 |
| WO | WO 2005/056926 A1 | | 6/2005 |
| WO | WO 2005056926 A1 | * | 6/2005 |

OTHER PUBLICATIONS

Joshua Prok, "Interstate Wind: Using New Technology to Enhance Transportation Fuel Investments;" Jun. 19, 2008; Transportation Law Journal; vol. 35:1, pp. 64-83.

*Primary Examiner* — Mirza Alam
(74) *Attorney, Agent, or Firm* — Oblon, McClelland, Maier & Neustadt, L.L.P.

(57) ABSTRACT

Pedestrian and motorist warning system that is powered from vehicle generated movement where there is little or no access to a power grid. Pedals maybe disposed on the road such that when a vehicle passes over it, it informs a controller system to activate a warning board or light to notify people of the oncoming vehicle, the signs or lights maybe placed besides a pedestrian crossing to alert pedestrians of the risk of an oncoming vehicle. Illuminating road corner LEDs, roadside lights and road arrows disposed in various sections of the road are also powered from vehicle generated movement operate on a set of programmed criteria's. Variables such as time of day, the speed of the vehicle, the weather, the temperature or fog all determine the way all the connected devices operate. Warning signals with built-in messaging systems can be disposed in strategic locations for motorists to see, the signals are self-powered and have the ability to store messages either by directly recording them onto the warning signal or by transferring a recorded message through a wired or wireless network.

7 Claims, 13 Drawing Sheets

(52) U.S. Cl.
CPC .. *H02J 7/32* (2013.01); *H02P 9/04* (2013.01); *F05B 2240/9113* (2013.01); *H05B 33/0854* (2013.01); *Y02B 20/72* (2013.01); *Y02E 10/725* (2013.01); *Y02E 10/728* (2013.01)

(56) References Cited

U.S. PATENT DOCUMENTS

| | | | |
|---|---|---|---|
| 4,250,395 A | 2/1981 | Lundgren | |
| 4,339,920 A | 7/1982 | Le Van | |
| 4,614,875 A | 9/1986 | McGee | |
| 6,734,575 B2 | 5/2004 | Ricketts | |
| 7,098,553 B2 * | 8/2006 | Wiegel et al. | 290/55 |
| 7,193,332 B2 | 3/2007 | Spinelli | |
| 7,427,173 B2 | 9/2008 | Chen | |
| 7,432,607 B2 | 10/2008 | Kim et al. | |
| 7,589,428 B2 | 9/2009 | Ghassemi | |
| 7,902,690 B1 | 3/2011 | Van Meveren et al. | |
| 7,964,984 B2 | 6/2011 | Saavedra | |
| 2003/0191577 A1 * | 10/2003 | Decaux | 701/117 |
| 2008/0149403 A1 * | 6/2008 | Fein et al. | 180/2.2 |
| 2011/0006540 A1 | 1/2011 | Ignatiev et al. | |
| 2011/0187125 A1 | 8/2011 | Jang | |
| 2012/0045314 A1 * | 2/2012 | Mauro et al. | 415/121.3 |
| 2012/0253996 A1 * | 10/2012 | Bernardy et al. | 705/28 |

* cited by examiner

|  | Night / Day | Road Corner LEDs | Road Arrows | Roadside LEDs |
|---|---|---|---|---|
| Capacity > 75% | Day | OFF | OFF | OFF |
|  | Night | ON | ON | ON |
| 50% < Capacity ≤ 75% | Day | OFF | OFF | OFF |
|  | Night | OFF | ON | ON |
| 25% < Capacity ≤ 50% | Day | OFF | OFF | OFF |
|  | Night | OFF | OFF | ON |
| Capacity < 25% | Day | OFF | OFF | OFF |
|  | Night | OFF | OFF | OFF |

FIG. 6

|  | Night / Day | Road Corner LEDs | Road Arrows | Roadside lights |
|---|---|---|---|---|
| Capacity > 75 % | Day | On | On | On |
|  | Night | On | On | On |
| 50 % < Capacity < 75 % | Day | OFF | On | On |
|  | Night | On | On | On |
| 25 % < Capacity < 50 % | Day | OFF | On | OFF |
|  | Night | OFF | On | On |
| Capacity < 25 % | Day | OFF | OFF | OFF |
|  | Night | OFF | On | On |

Fig. 7

|  | Temprature / humidity detector | Fog detector | Light actions | Description of light actions |
|---|---|---|---|---|
| 40 Mph < Speed < 0 Mph | 90 < Fahrenheit < 50 | 30% < 0 | Light will illuminate in a yellow color | In all the cases the sign will warn the driver of an |
| 50 Mph < Speed < 40 Mph | 50 < Fahrenheit < 30<br>100 < Fahrenheit < 90 | 50% < 30% | Will flash on & off in a yellow color | oncoming venicle.<br>Depending on the speed |
| 60 Mph < Speed < 50 Mph | 30 < Fahrenheit < 10<br>110 < Fahrenheit < 100 | 70% < 50% | Will flash on & off in an orange color | Temprature or fog levels<br>the sign will react differently |
| Speed > 60 Mph | 10 < Fahrenheit < (-)<br>(+) < Fahrenheit < 110 | 100% < 70% | Will flash on & off in a red color | according to the look up<br>up table stored in the memory |

Fig. 8

WARNING APPLICATION SYSTEMS FOR VEHICLE MOVEMENT ACTIVATED ELECTRICAL POWER GENERATOR, AND METHOD FOR PROVIDING ELECTRICAL POWER

CROSS REFERENCE TO RELATED APPLICATION

The present application is related to application Ser. No. 13/469,827, filed May 11, 2012, the entire contents of which is incorporated herein by reference.

BACKGROUND

1. Grant of Non-Exclusive Right

This application was prepared with financial support from the Saudi Arabian Cultural Mission, and in consideration therefore the present inventor has granted The Kingdom of Saudi Arabia a non-exclusive right to practice the present invention.

2. Field of the Disclosure

This disclosure relates to local electrical power generation from vehicle movement, and more specifically, to local electrical power generation from vehicle movement to provide roadside information on the road ahead of a vehicle.

3. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present invention.

Generating electrical power from vehicle movement has been the subject of ongoing efforts. Moving automobile traffic generates wind currents which can be harnessed to drive a turbine and generate electricity. Alternatively or additionally, the weight of moving vehicles can be used in a pressing mechanism, and this pressing mechanism can be translated into a rotational mechanism to drive a turbine and generate electricity.

Often in remote areas there are wide roadways with limited visibility along the breadth of the road, especially along ones that bend around such large objects as mountains or building structures. Also very often cross-road entrances and exits are difficult to see in hazardous weather conditions. Therefore it can be beneficial to have visual aids such as imbedded lights in the road indicating their locations to help the driver coordinate to their desired route.

SUMMARY

Lack of access to an electrical grid in remote roads prohibits sufficient use of road illumination and other roadside applications. In recognition of this deficiency, the present inventor recognized the benefits of using self-generated electricity from vehicle movement to activate road side warning apparatuses such as warning signals and an audio warning system. In one example, the signal warns pedestrians who wish to cross the road that there is a vehicle rapidly approaching the pedestrian crossing. Also included in the system are warning apparatuses that guide drivers through difficult road conditions, such apparatuses include warning lights placed in very visible locations along the road to warn drivers of such things as sharp bends in the road and of oncoming traffic. Also an audio messaging system and apparatus allowing motorists to record and listen to messages about potential hazards can be disposed by the side of the road. The warning systems works in conjunction with an isolated power system that serves as the power supply for the specific applications. Turbines disposed alongside, above, or under the road, use the wind currents generated by a vehicle to run an electrical power generator connected to an isolated electrical power system providing electrical power for the notification applications for the moving vehicle. Alternatively, pedals may be dispensed on the road such that when a vehicle passes over them, the vertical motion of the pedals, and the associated force, are translated into a rotational motion to drive an electrical power generator. The turbines and the pedals also serve as triggers that notify the system that a vehicle is present to activate the required applications. The isolated electrical power system may be used to supply power for roadside LEDs placed along the road ahead of the vehicle to illuminate the boundaries and the perimeter of the road. The isolated electrical power system may also be used for other applications such as a roadside sign, a deer whistle, or a camera.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a an exemplary embodiment of a look up table saved on a static storage device and used to control a local electrical power system.

FIG. 7 is an exemplary embodiment of a look up table for hazardous weather conditions, it is saved on a static storage device and used to control a local electrical system.

FIG. 8 is an exemplary embodiment of a look up table for an illuminating warning sign based on speed, temperature and fog.

DETAILED DESCRIPTION OF THE EMBODIMENTS

Figure 1:
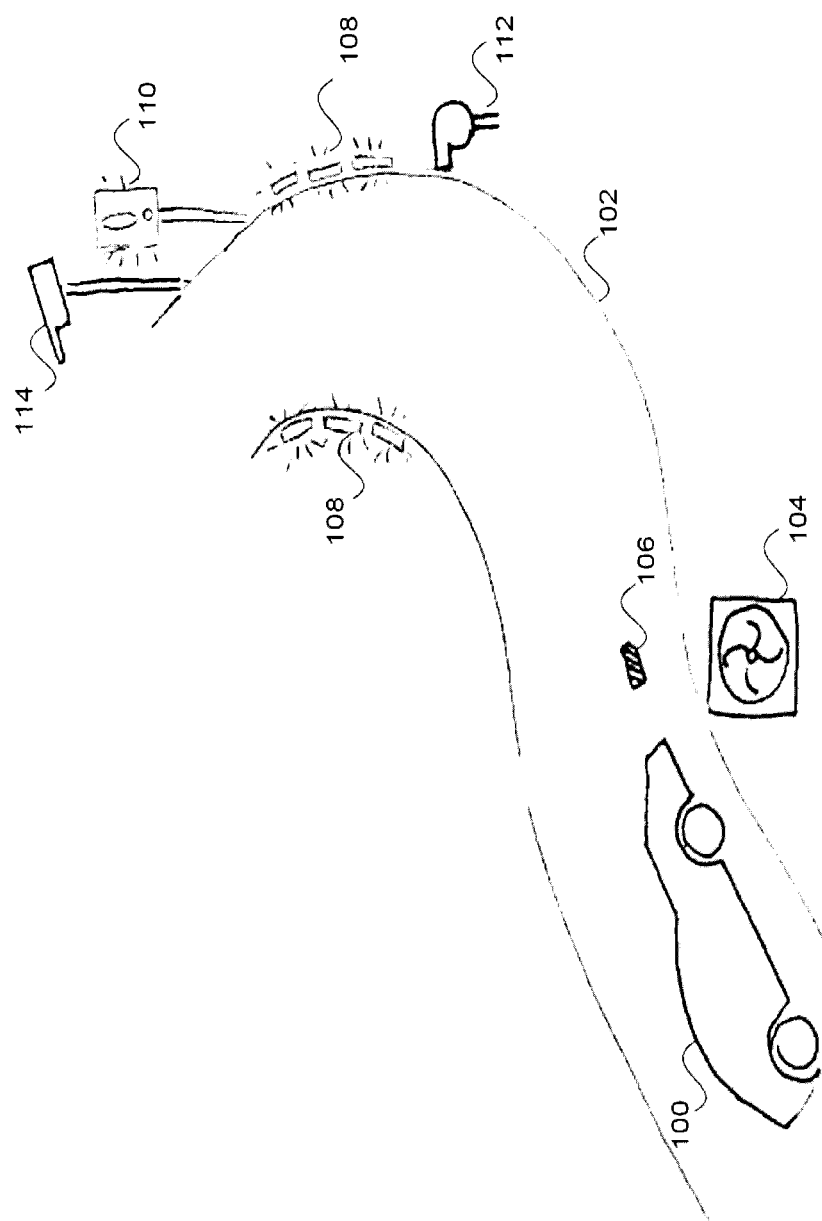
FIG. 1 is a perspective view of a remote road with electrical applications on the road ahead of a vehicle.

Referring now to the drawings, wherein like reference numerals designate identical or corresponding parts throughout the several views, FIG. 1 is an illustrative view of a remote road 102 with electrical devices on or adjacent to the road ahead of a vehicle 100. The vehicle 100 is shown to pass by a turbine 104 and/or over a pedal 106. The turbine 104 and the pedal 106 are properly coupled with a generator (described later in FIG. 5) to generate electrical power. The turbine 104 may be a commercially available wind turbine such as "Lionel Operating Wind Turbine" from Lionel. The pedal 106 may be mechanically coupled with a commercially available bicycle dynamo generator such as "X Factor 3-Inch Generator Light Set" from X Factor.

Alternatively, a plurality of turbines and/or pedals may be used to generate electrical power. The turbines may be disposed alongside, above, or under the road 102.

The generated electrical power is used to supply power for a number of electrical devices on the road ahead of the vehicle, such as roadside LEDs 108 to illuminate the boundary and perimeter of the road ahead of the vehicle, a roadside sign 110, a camera 114, or a deer whistle 112. The LEDs 108 may be disposed on the road surface with an upper display surface exposed. Alternatively, the LEDs 108 may be mounted on a structure built along the road, with a side display surface facing the road. The LEDs 108 may be placed more condensed on the curved portions of the road, and less condensed on the flat portions of the road. The deer whistle 112 may be a commercially available deer whistle such as "Portable Electronic Deer Alert Warning Whistle" from AAA Communications.

Figure 2:
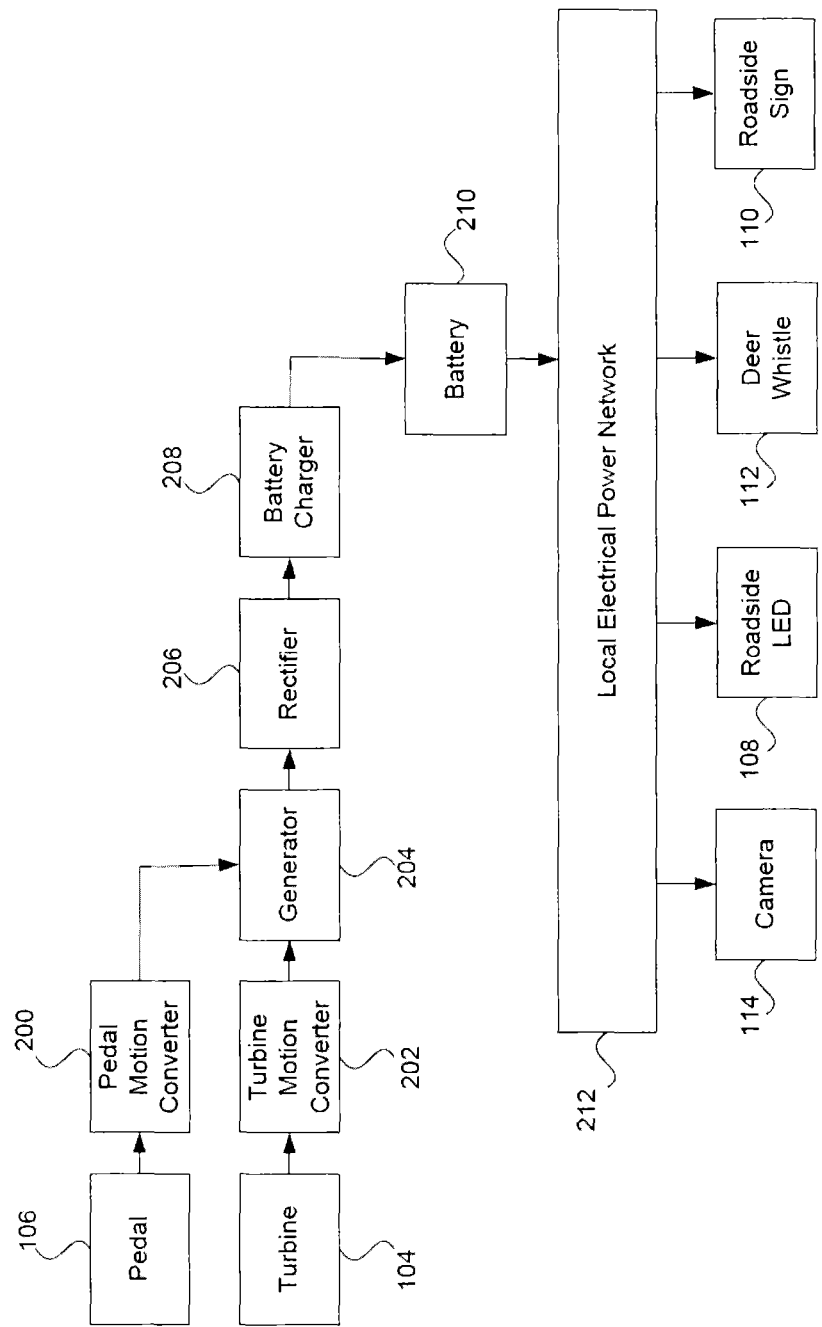
FIG. 2 is a system block diagram of a preferred embodiment of a local electrical power system.

FIG. 2 is a system block diagram of a local electrical power system. The pedal 106 and the turbine 104 are coupled with a pedal motion converter 200 and a turbine motion converter 202 respectively. The pedal motion converter 200 converts the vertical motion of the pedal into a rotational motion. The turbine motion converter 202 converts the rotational motion of the turbine into a rotational motion at a faster Rotations Per Minute (RPM) rate. Both the pedal motion converter 200 and the turbine motion converter 202 are coupled with a generator 204 such that when the pedal 106 is pressed or when the turbine 104 rotates, the generator 204 generates electricity. The pedal 106 and the turbine 104 may alternatively be coupled with separate generators.

The electricity generated by the generator 204 is rectified by a rectifier 206. The rectifier 206 may be a diode bridge. The output of the rectifier 206 is connected to the input of a battery charger 208 which charges a battery 210. The battery 210 is connected to a local electrical power system 212. The local electrical power system 212 provides power for electrical devices on the road ahead of a moving vehicle.

The aforementioned method of providing electricity to be used in front of a vehicle is particularly beneficial in remote roads where there is no access to an electrical power grid. Such method of locally providing electricity makes it possible to activate roadside safety and information devices to aid the driver on the road ahead.

Figure 3:
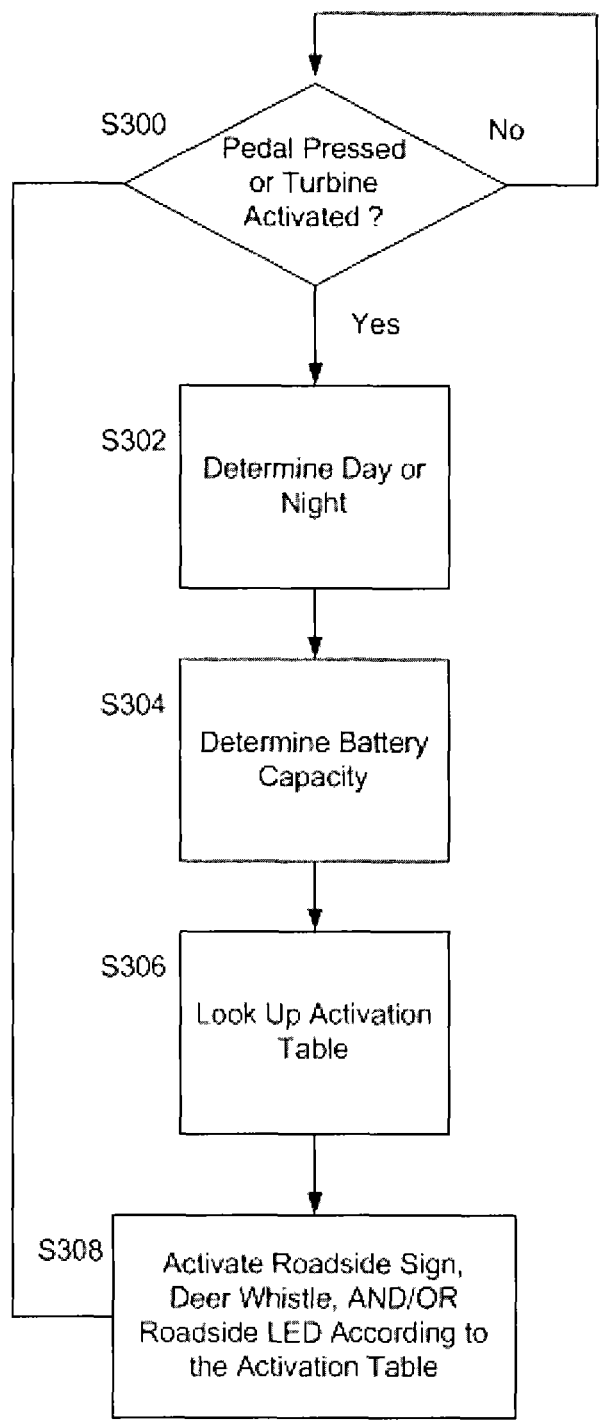
FIG. 3 is a flowchart of an exemplary embodiment of a method of controlling a local electrical power system.

FIG. 3 is a flowchart of a method of controlling a local electrical power system. The process begins in step S300 which is a waiting state where the system waits for a pedal to be pressed and/or a turbine to be activated. Once it is determined that a pedal is pressed or a turbine is activated, the process proceeds to step S302 where it is determined, according to a clock or a light sensor, whether it is day time or night time. Then in step S304 the remaining charge of a battery providing power to the local electrical power system is checked. In step S306, based on the outcome of the determinations in steps S302 and S304, a look up table is checked to determine the roadside devices to be activated in front of the vehicle. In step S308, roadside devices are activated according to the outcome of step S306, and the process returns to the waiting state in step S300.

Figure 4:
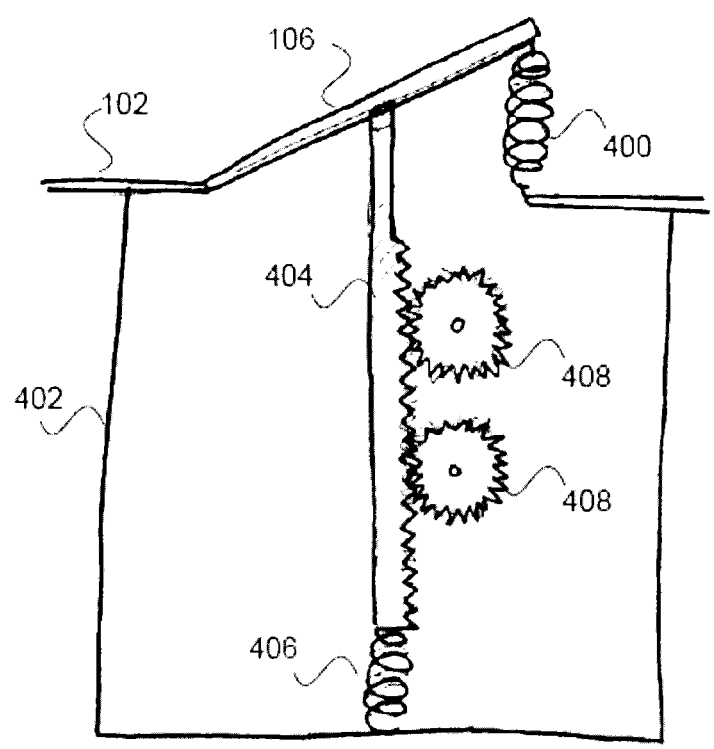
FIG. 4 is an illustrative view of an exemplary embodiment of a pedal on the road to convert a pressing mechanism into a rotational mechanism.

FIG. 4 is an illustrative view of a pedal 106 on the road to convert a pressing mechanism into a rotational mechanism. A conduit 402 is disposed under the pedal 106. A first spring 400, when in its relaxed state, holds the pedal 106 protruding upward on the road 102. The pedal is pivotally connected to the upper end of a lever 404. The lever 404 is vertically positioned within the conduit 402. The lower end of the lever 404 is attached to the bottom surface of the conduit 402 by a second spring 406 such that the lever 404 is held vertically when the first spring 400 and the second spring 406 are in their relaxed state.

When a vehicle passes over the pedal 106, the pedal 106 is pressed, forcing the first spring 400 into a pressed state. The movement of the pedal 106 forces the lever 404 downward, which in turn forces the second spring 406 into a pressed state. After the vehicle weight is removed from the pedal 106, the first spring 400, and the second spring 406 move back to their relaxed state. The transition of the first spring 400 and the second spring 406 into a pressed state and then back into a relaxed state causes the lever 404 to move downward and then upward. The lever has a threaded surface adapted to a threaded perimeter of a plurality of wheels 408 placed next to the lever 404, such that the downward and upward movement of the lever 404 causes the plurality of wheels 408 to rotate, thereby translating the vertical movement of the pedal 106 into a rotational movement.

The downward force of the pedal may also be used to turn a fly wheel, which in turn drives a rotor in a winding to provide a sustained electrical current.

Figure 5:
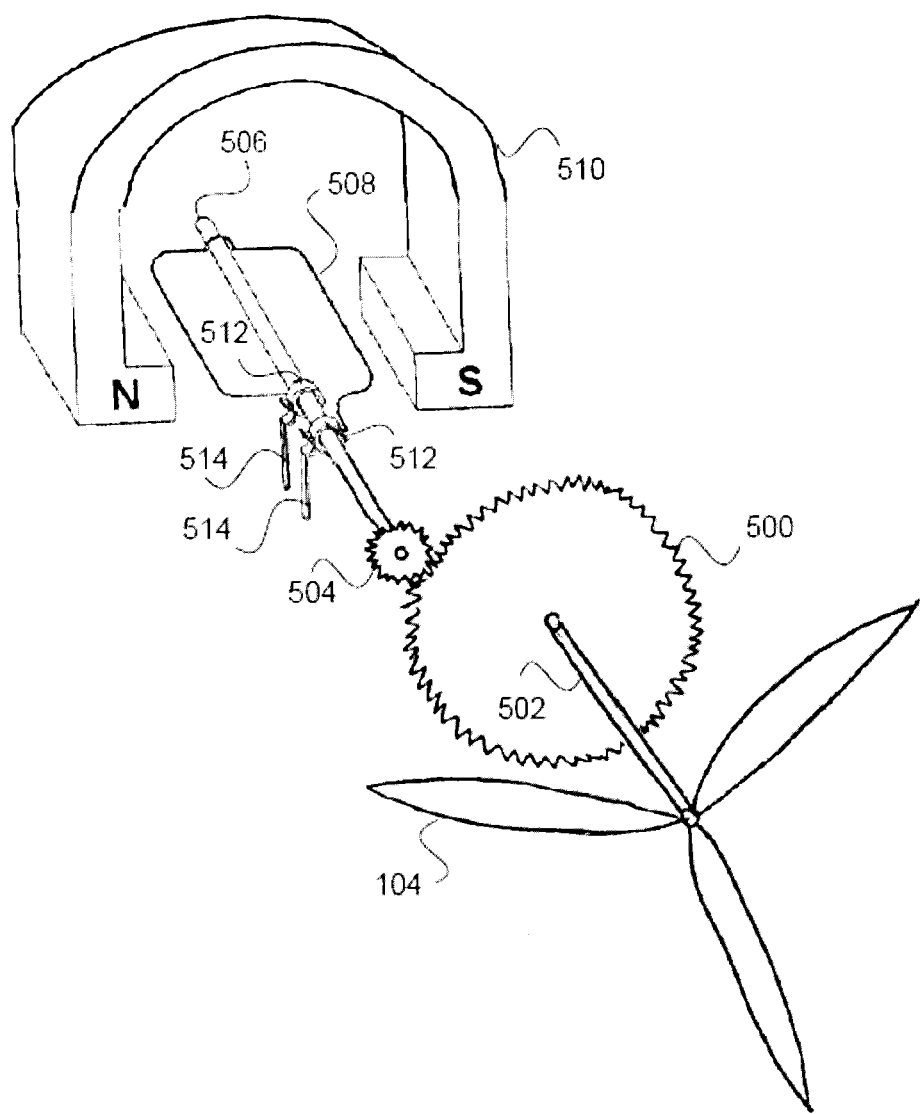
FIG. 5 is an illustrative view of an exemplary embodiment of a turbine connected to a generator.

FIG. 5 is a perspective view of a turbine connected to a generator. The turbine 104 is connected to a wide gear wheel 500 by a turbine shaft 502. The wide gear wheel has a toothed perimeter. A narrow gear wheel 504 is in contact with the wide gear wheel 500. The narrow gear wheel 504 has a toothed perimeter that meshes with the toothed perimeter of the wide gear wheel 500. The narrow gear wheel is connected to a generator shaft 506. A wire loop 508 is attached to the generator shaft 506. A horseshoe magnet 510 (or a stator with windings) surrounds the wire loop 508. The wire loop 508 has a conductive loop 512 on each of its two ends. Each conductive loop 512 is in contact with a conductive brush 514. When the turbine 104 rotates, the wide gear wheel 500 rotates, causing the narrow gear wheel 504, the generator shaft 506, and the wire loop 508 to rotate at a faster RPM. The rotation of the wire loop 508 within the horseshoe magnet 510 induces alternating electric current between the conductive loops 512. This alternating current is transferred to a rectifier via the conductive brushes 514.

FIG. 6 is a look up table saved on a static storage device and used to control a local electrical power generation system. This table may be used by a local electrical power system controller to control the electrical roadside devices. The first column from the left indicates the battery capacity which is the amount of electrical charge left on the battery. The second column from the left indicates whether it is day time or night time. The top row indicates the roadside electrical applications. As an example, according to the last two rows of the look up table, when the battery capacity is less than 25%, irrespective of the time of the day, none of the electrical devices will be turned ON. Also, it can be seen throughout the look up table that the roadside sign and the LEDs are always OFF during day time, irrespective of the battery capacity.

FIG. 7 is a look up table saved on a static storage device and used to control a local electrical power generation system. This table may be used by a local electrical power system controller to control the electrical roadside devices specifically in times of hazardous weather conditions. The first column from the left indicates the battery capacity which is the amount of electrical charge left on the battery. The second column from the left indicates whether it is day time or night time. The top row indicates the roadside electrical applications. As an example, according to the last two rows of the look up table, when the battery capacity is less than 25%, irrespective of the time of the day, none of the electrical devices will be turned ON. Also, it can be seen throughout the look up table that the roadside sign and the LEDs are always OFF during day time, irrespective of the battery capacity.

Figure 9:
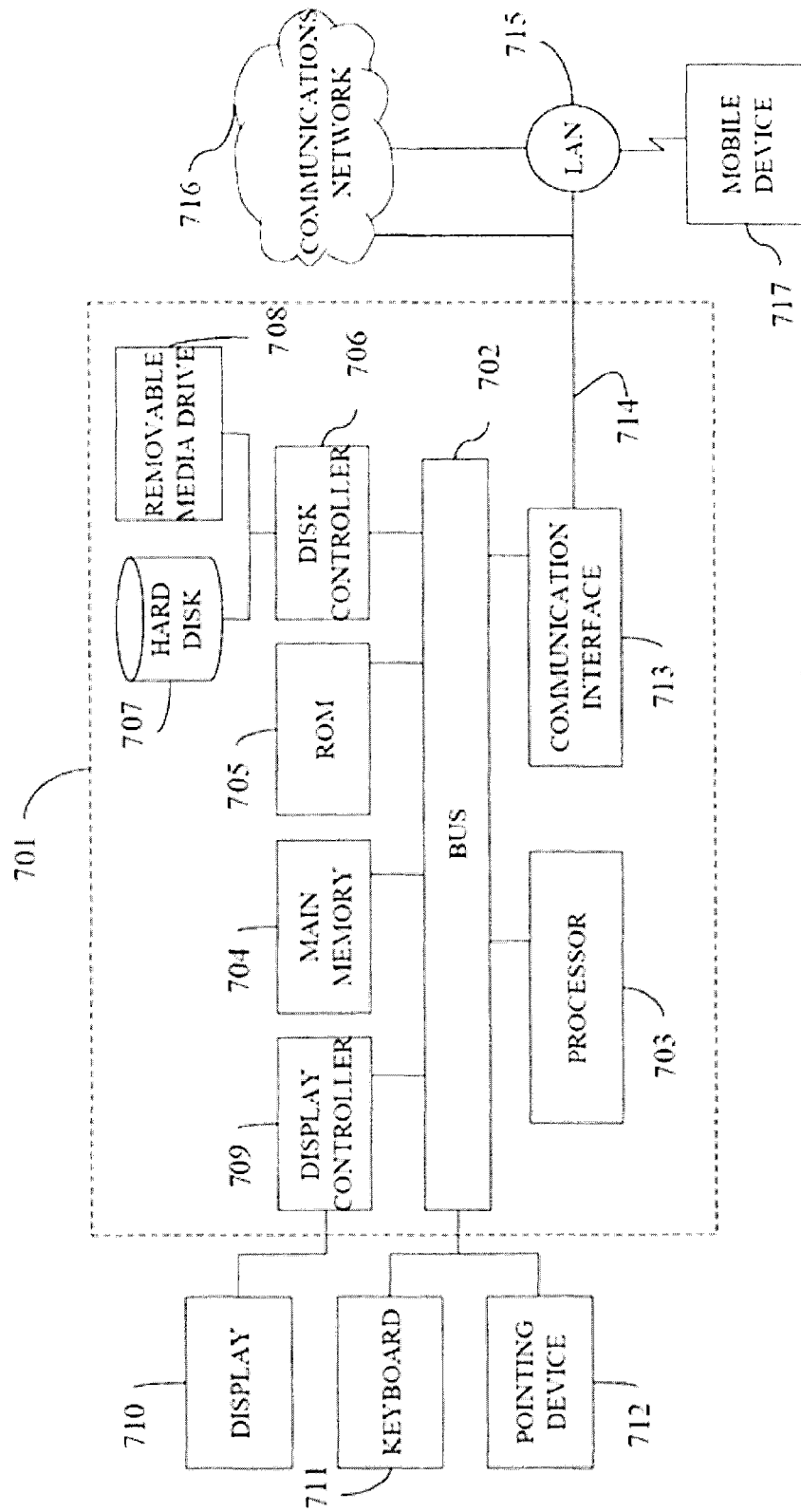
FIG. 9 illustrates a computer system upon which an embodiment of a controller for controlling the local electrical power system may be implemented.

FIG. 9 illustrates a computer system 701 upon which an embodiment of a controller for controlling the local electrical power system may be implemented. The computer system 701 includes a bus 702 or other communication mechanism for communicating information, and a processor 703 coupled with the bus 702 for processing the information. The computer system 701 also includes a main memory 704, such as a random access memory (RAM) or other dynamic storage device (e.g., dynamic RAM (DRAM), static RAM (SRAM), and synchronous DRAM (SDRAM)), coupled to the bus 702 for storing information and instructions to be executed by the processor 703. In addition, the main memory 704 may be used for storing temporary variables or other intermediate information during the execution of instructions by the processor 703. The computer system 701 further includes a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 also includes a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 701 may also include a display controller 709 coupled to the bus 702 to control a display 710, such as a cathode ray tube (CRT), for displaying information to a computer user. The computer system includes input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing steps of the invention in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 701, for driving a device or devices for implementing the invention, and for enabling the computer system 701 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 703 for execution. A computer readable medium may take many forms, including but not limited to, non-volatile media, volatile media, and transmission media. Non-volatile media includes, for example, optical, magnetic disks, and magneto-optical disks, such as the hard disk 707 or the removable media drive 708. Volatile media includes dynamic memory, such as the main memory 704. Transmission media includes coaxial cables, copper wire and fiber optics, including the wires that make up the bus 702. Transmission media also may also take the form of acoustic or light waves, such as those generated during radio wave and infrared data communications.

Various forms of computer readable media may be involved in carrying out one or more sequences of one or more instructions to processor 703 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 701 may receive the data on the telephone line and use an infrared transmitter to convert the data to an infrared signal. An infrared detector coupled to the bus 702 can receive the data carried in the infrared signal and place the data on the bus 702. The bus 702 carries the data to the main memory 704, from which the processor 703 retrieves and executes the instructions. The instructions received by the main memory 704 may optionally be stored on storage device 707 or 708 either before or after execution by processor 703.

The computer system 701 also includes a communication interface 713 coupled to the bus 702. The communication interface 713 provides a two-way data communication coupling to a network link 714 that is connected to, for example, a local area network (LAN) 715, or to another communications network 716 such as the Internet. For example, the communication interface 713 may be a network interface card to attach to any packet switched LAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc). The signals through the various networks and the signals on the network link 714 and through the communication interface 713, which carry the digital data to and from the computer system 701 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection through a LAN 715 to a mobile device 717 such as a personal digital assistant (PDA) laptop computer, or cellular telephone.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Figure 10:
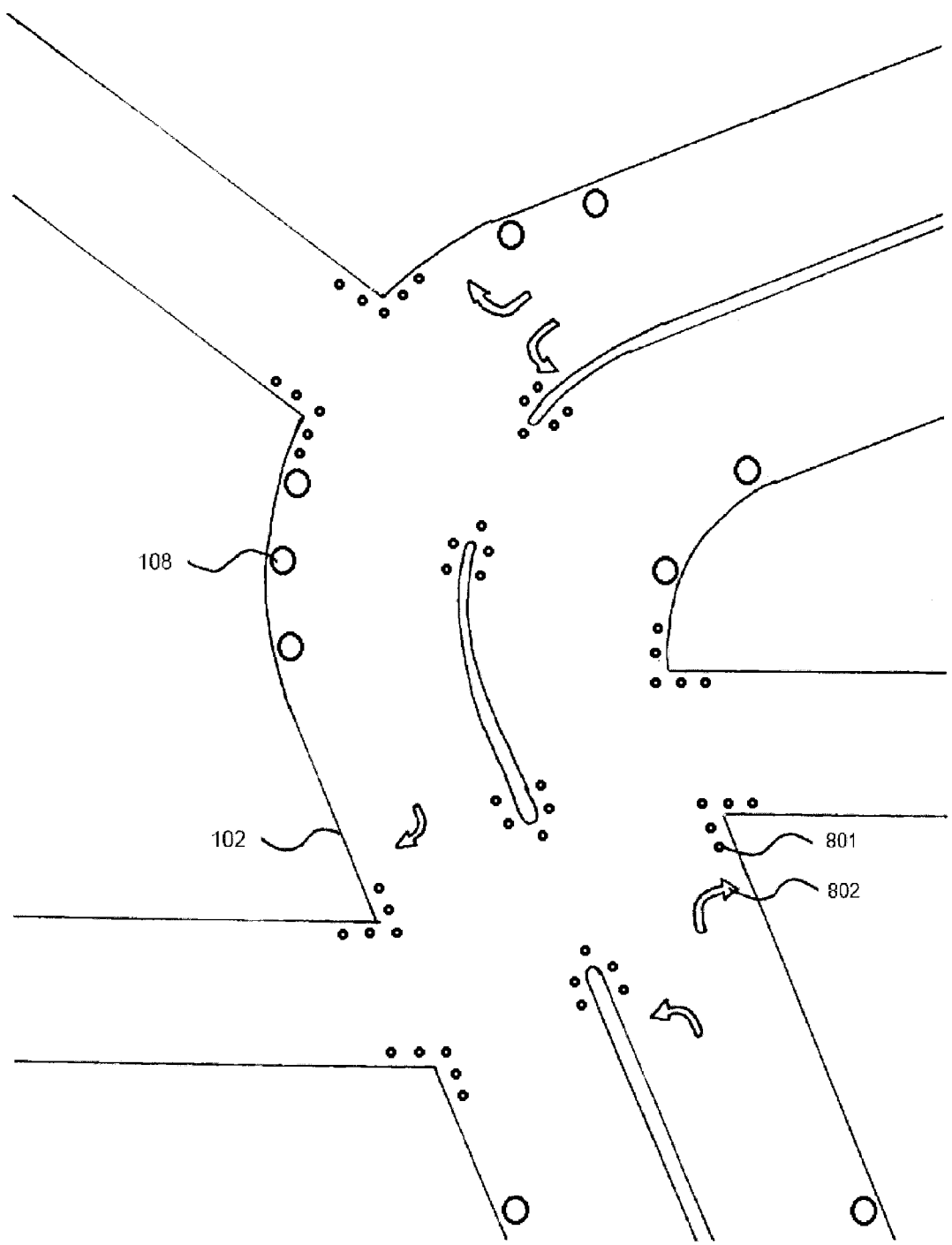
FIG. 10 is an aerial view of a roadway with a number of attaching smaller roads.

FIG. 10 is an illustrative view of a remote road 102 with electrical bright (guidance) lights 108 placed on road turnoffs from the main road to help highlight the exits 801. On the sides of the main road are the guidance lights 108 that help drivers see the bends in the roads 802. These are especially useful in dangerous mountainous areas where there is little to no light and areas prone to hazardous weather conditions. They illuminate the road edges and are designed to enable drivers to see the turns in the roads before the driver actually reaches the turn. Also placed in the road are illuminating electrical bright lights in the shape of road arrows indicating that there upcoming exits a head of the driver 803. These lights are used on the main roads and function day or night in conditions of limited vision such fog or heavy rain. They are activated by a switch pedal 106 in the road or by a weather sensor or by a main control center. As was previously discussed the lights 108 are powered by the dynamical forces of the vehicle passing over or by the roadside power generators.

The lights on exit slips and on road corners 801 are miniature and function on little energy. The lights 108 in this embodiment are, but not limited, to low powered bright LEDs that fit into fixtures in the ground, they are protected by a durable transparent material. The lights are replaceable by removing them from the road fixtures and substituting them with new lights.

Illuminating arrows in the road help inform drivers of the road directions they are able to take when confronted by a complicated intersections or simply a slip road turning off of a main road. They inform the drivers in advance helping them to take important decisions when driving in difficult conditions.

Because the lights 108 in this embodiment are powered by the dynamic forces of the approaching vehicle, the local electrical power system also includes a speed sensor that detects the speed of the approaching vehicle. If the detected speed is greater than a predetermined threshold. The local electrical power system sends a digital signal to a light (controller) describing the vehicle speed. The light controller is also powered by the local generation power system such that it wakes up when an electrical current flows to it from the local electrical power system. The light controller compares the speed with predetermined thresholds saved in memory. As long as the speed is below a first threshold, the guidance lights 108 are illuminated at a fixed brightness level. However, if the light controller detects that the speed is above a second threshold, the light controller sends either a pulsed power to the lights to make them flash, or a control signal to the lights to have them change color, thus serving as a warning to the driver of the approaching vehicle that the driver is moving at an unsafe speed. The light controller also includes a temperature and humidity detector. The light controller uses different threshold values depending on the detected temperature (e.g., below 32 degrees suggesting it might be icy), at 100% humidity suggesting the road may be slippery due to precipitation (rain or snow). Furthermore, the light controller includes an optical detector that detects if conditions are foggy, and if so further adjusts the threshold values. These threshold values are stored in a look-up table as described in FIG. 8.

Figure 11:
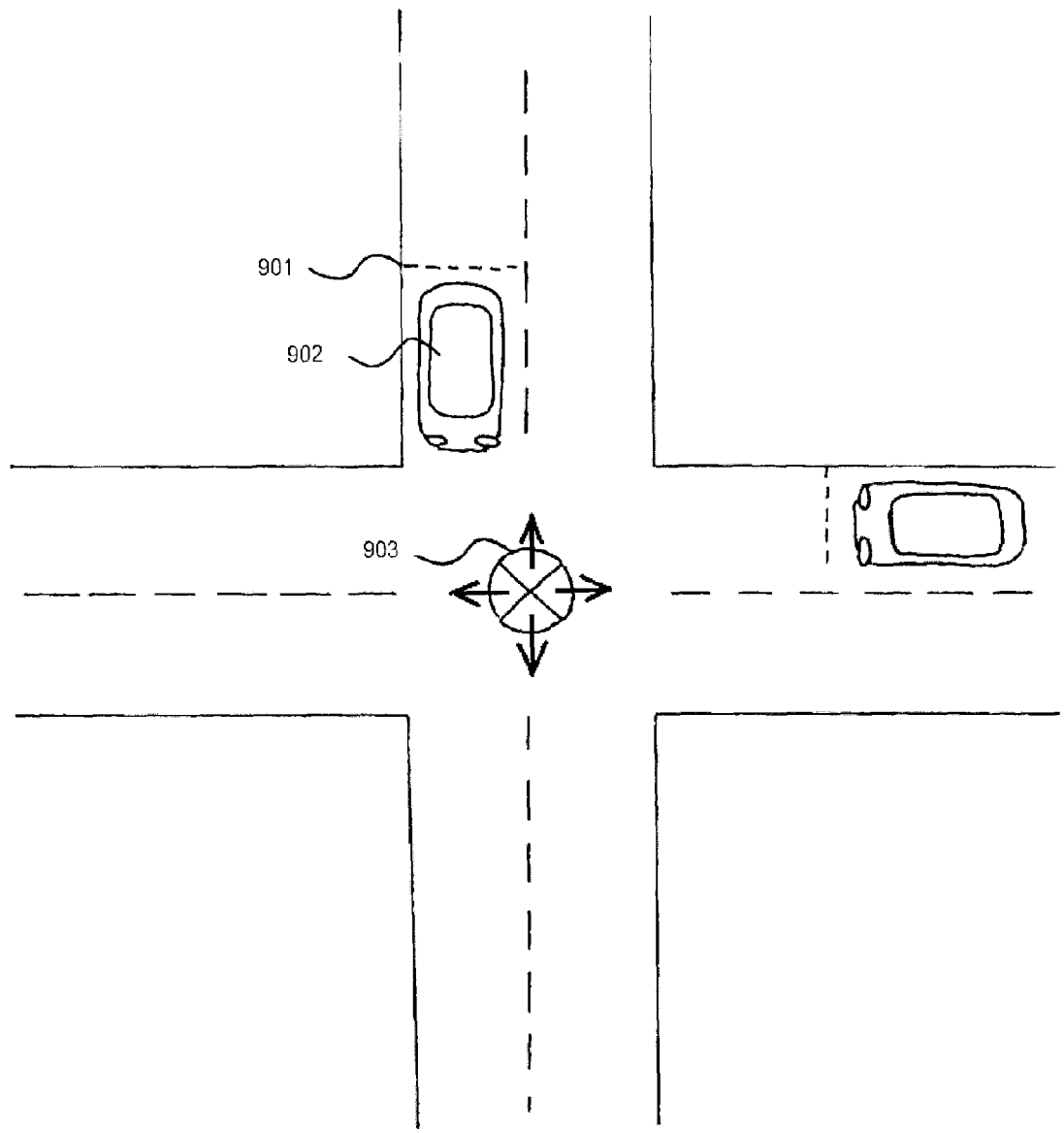
FIG. 11 is an aerial view of an intersection with an imbedded road signal apparatus that informs motorist of other approaching motorist from the adjacent directions.

FIG. 11 is an overhead view of a roadway with an imbedded light signal 903 that is placed in the center of a road intersection; it is fixed to the ground with a warning light facing outwards in every direction. Switch pedals in the road 901 are placed at a distance from the intersection so that when a vehicle 902 passes over one of them, lights facing the adjacent roads activate emitting a red signal to warn the drivers of oncoming traffic that there is a vehicle approaching on the adjacent road.

If there are no vehicles crossing the intersection and there is no danger from the opposing directions then the imbedded light signal will shine green in the direction of the oncoming driver indicating that it is safe to proceed. When the green light is triggered in one direction of the imbedded light signal 903 then simultaneously red signals are activated in the opposing directions to make other drivers on the adjacent road aware that there is another car approaching the intersection. The imbedded light signal also includes a wireless transmitter that sends a wireless signal indicating that another vehicle is approaching the intersection. A receiver in the first vehicle is either built into a navigation system, or an application on a smartphone or wearable computer, issues a warning to the driver and informs the driver where the another vehicle is located with respect to the intersection. This signal warns the driver of the first vehicle that another vehicle will likely either have passed the intersection before the first vehicle arrives or the two may arrive at roughly the same time. This warning alerts the driver of the first vehicle not only that there is an upcoming intersection on the remote road, but there is another vehicle in the vicinity. This warning system wakes up only when needed (i.e., triggered and powered by the approaching vehicle) and avoids needing to provide power to the imbedded light 24 hours a day.

The receiver in the vehicle can be a smartphone, for example that has a wireless reception capability, as well as a capability to host various apps. The warning system may be implemented in an app that includes user-selectable distances to generate the warnings, according to user preference.

The app may also be used in combination with the imbedded light to warn other vehicles that will approach the intersection in the future about odd situations on the remote roadway. Moreover the imbedded light may also include a memory that stores messages left by earlier vehicles. For example, if an earlier motorist deposited a message with the imbedded light regarding a herd of deer the motorist viewed while approaching the intersection (or a frozen bridge, etc.) the imbedded light can broadcast those messages to later-arriving approaching vehicles who themselves have a compatible app that allows for the reception of the warning messages. Thus the imbedded light may also serve the function as a vehicle powered message posting system that allows motorists to post messages about the rural road conditions. Optionally, the messages are purged after a predetermined period (e.g. 1 day). In addition, a remote monitoring station may receive the messages and screen them out if any inappropriate messages are left, or if the messages become stale.

Figure 12:
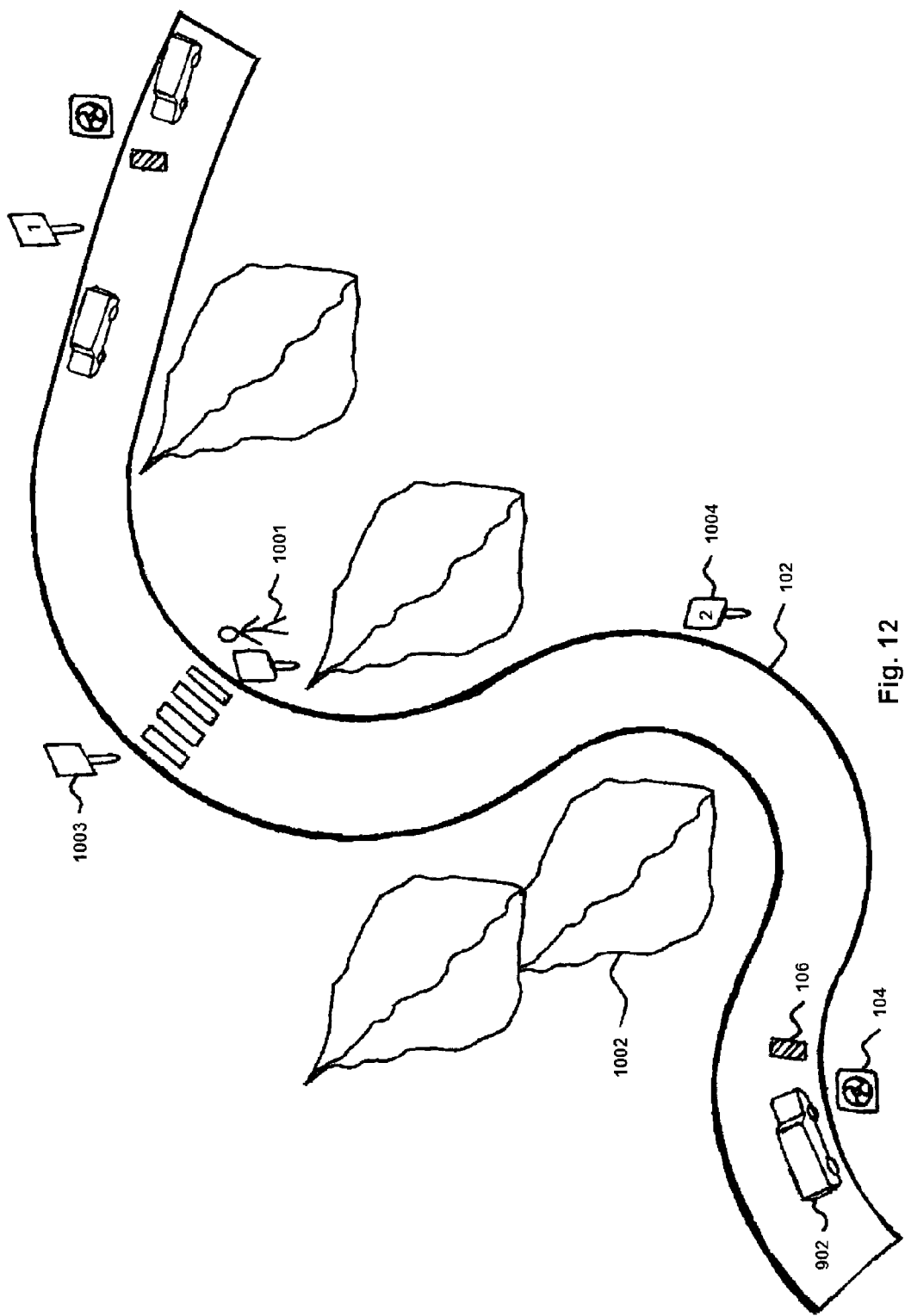
FIG. 12 is an aerial view of a remote road with electrical applications for pedestrian warning signals and warning boards informing motorist of approaching traffic from the opposite direction.

FIG. 12 is an application meant for mountainous environments. Its primary function is to alert pedestrians and other motorist of oncoming traffic. It consists of a pedal switch 106 that controls lights on a pedestrian crossing signboard 1003, as vehicles approach the crossing they pass the pedal switch which controls the lights on the crossing informing pedestrians 1001 that it is not safe to cross. The sign can also indicate to the pedestrian the direction the vehicle is approaching from, it can show the speed of the vehicle and the number of vehicles there are if needed.

Signs that are triggered by vehicles approaching in the opposite direction can be set up to warn motorist of oncoming traffic 1004. As the traffic passes over the pedal switches the system not only activates a warning for the pedestrians of approaching traffic, warning signs on the opposing side informs oncoming traffic behind the visual obstructions 1002 that traffic is approaching.

The system is able to count the number of cars and record the speed they are travelling in. It displays the information on a board to warn drivers in the opposite direction that might be in danger that oncoming traffic is around a corner or over a slope. The sign boards will be placed in clear view of the drivers in both directions so that the drivers moving in the opposite direction can slow down or stop.

Figure 13:
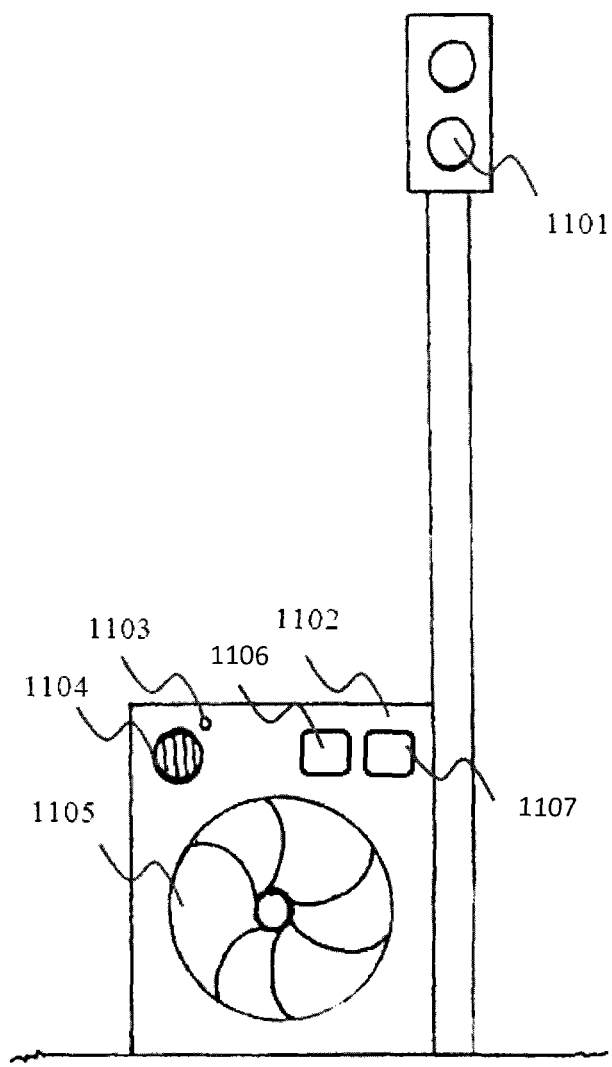
FIG. 13 is an illustrative view of an exemplary embodiment of the turbine and generator unit with an attached warning light.

FIG. 13 illustrates a warning signal with a transceiver and data memory, it is made up of a number of parts, the turbine that generates electricity when a vehicle passes, imbedded circuits that process the above and below described functions and a warning signal. The warning signal 1101 resembles a traditional traffic light; it is attached on top of a pole with the intention of being in clear view for motorists. Apart from the warning light all of the components are encased in a durable metal type material designed to withstand harsh outdoor weather conditions 1102. Situated inside the device is a series of electrical components; the turbine component 1105 is positioned in the unit with an opening for air to pass through it and rotate the fan. Also built into the unit is a speaker and microphone 1104, it enables people to record messages directly into the machine and play back any messages already stored in it. 1103 is an illustration of a button that enables the person recording the information to control the functions of the electrical device. 1106 is a memory storage unit, is stores recorded data for motorists to listen to. 1107 is a transceiver it either sends recorded data or receives it from a wireless or wired network.

Figure 14:
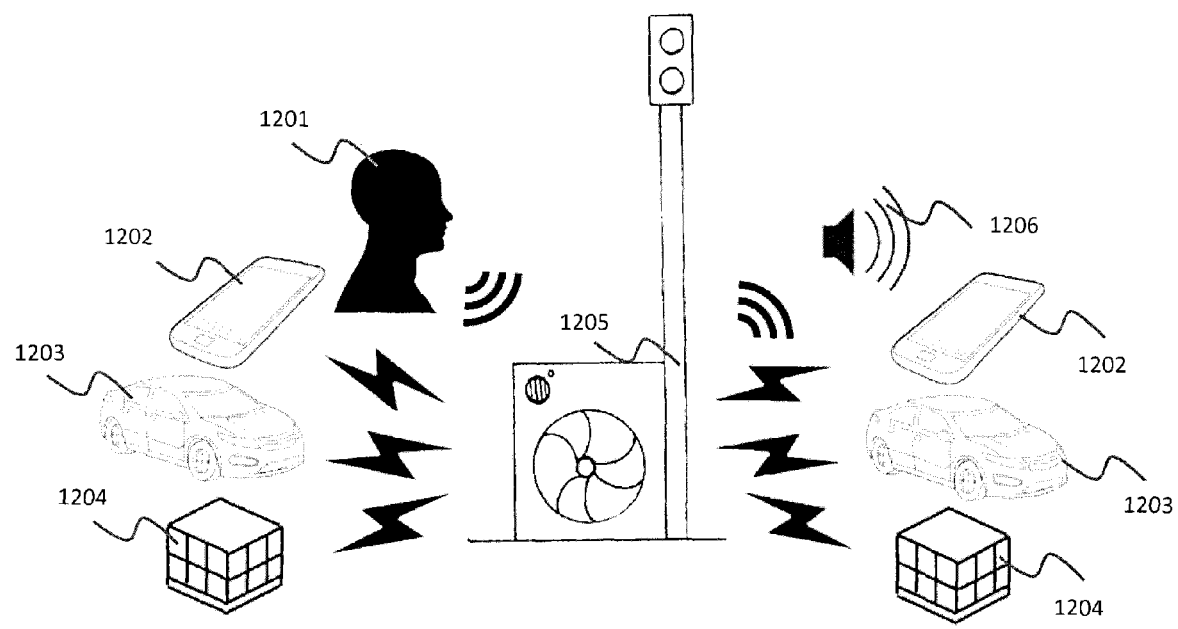
FIG. 14 is an illustrative view of a method of recording and receiving messages according to the present embodiment.

FIG. 14 illustrates the different ways information can be stored onto the unit 1205 and also the different devices that can retrieve the information from it. 1201 is a depiction of a person speaking directly into the microphone 1104 in the unit; the person would activate the record mode of the unit through the buttons 1103 on the unit's exterior. Motorists would not be limited to recording manually, an option of recording a message from a wireless device such as a smartphone 1202 could be an option as discussed above (providing that there is network coverage and the appropriate technical application set up), the user can record a message onto an online data base that would then download the message to the unit 1205.

Another method for a person to place a message onto the unit can be from an apparatus installed in the vehicle 1203. A person can record a message onto the onboard apparatus and then transfer the message either directly to the unit wirelessly or via the wireless telecommunications network. The unit 1205 has a wired or wireless connection to an information center 1204; the message center can send messages wirelessly to be stored on the said unit for passing motorists to listen to. The motorists would have the option of calling the message center to inform them of the message to record; the center can create a message and store it onto the appropriate unit.

As well as having alternative methods to inputting messages to the Unit 1205 there can be a number of different ways messages can be received from it. The most basic method would be from a speaker built into the unit, after seeing the warning signal lit the person can stop the vehicle, push a button 1103 on the unit to play the stored message. Alternatively the messages can be retrieved from a wireless smartphone device 1202 through a specialized application or through an onboard device in the automobile 1203.

Figure 15:
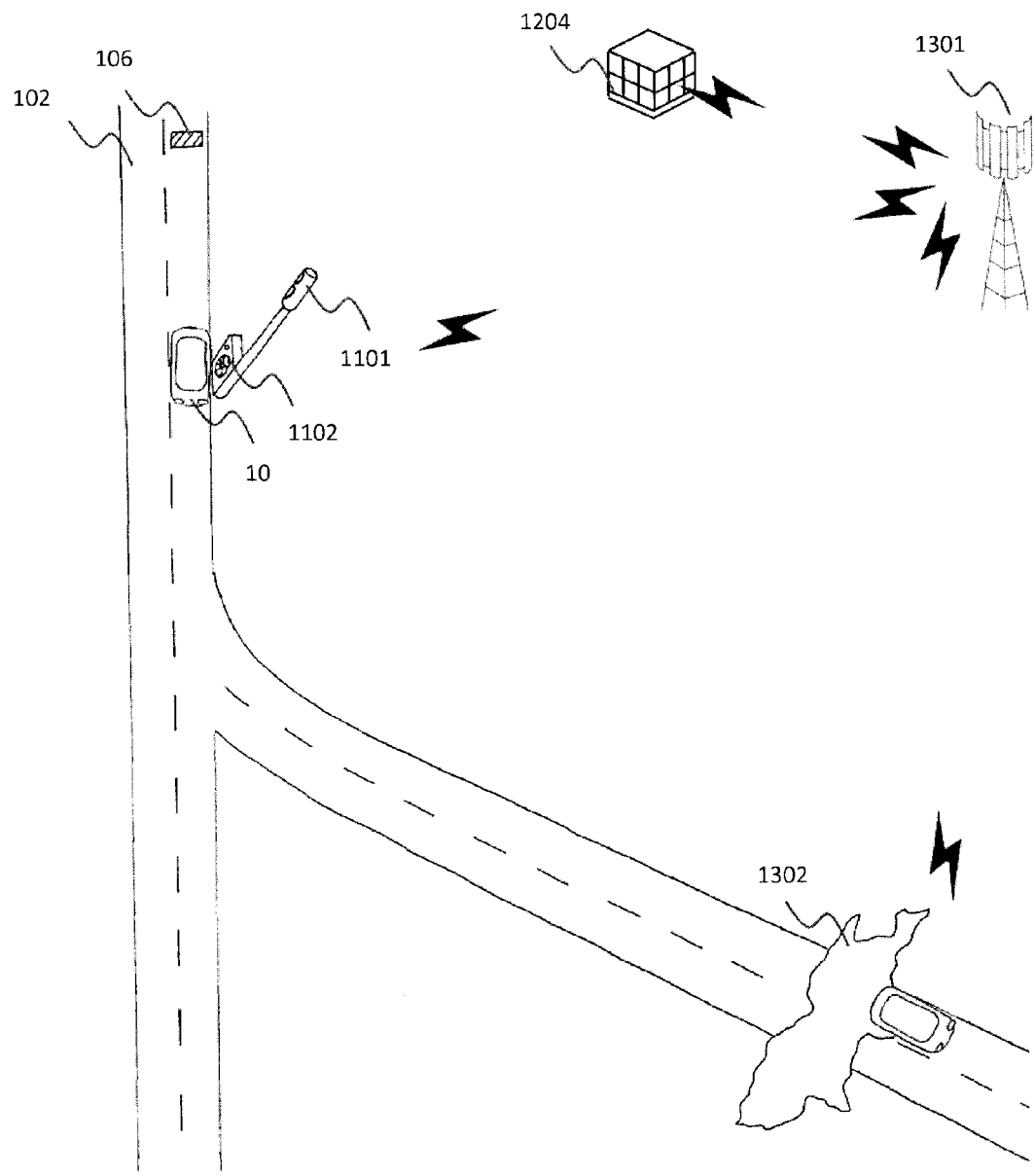
FIG. 15 is an aerial view of a remote road that illustrates different ways in which communication devices can store information according to the present embodiment.

FIG. 15 is an illustrative aerial view of a road 102 where there has been an obstruction 1302 route. In this example the motorist 100 has decided to leave a message on the nearest unit 1102 to warn other motorists of the obstruction and to tell them not to take the turn off. A message is sent either by a smartphone application or by an onboard transmitting device, the message is transmitted through the telecommunication networks 1301 to the unit the 1102 for other motorists to hear. When a message is stored on the unit, vehicles passing over the pedal 106 will activate the light signal 1101 informing them that there is a message stored for them to listen to.

The system can be administrated by the information center 1204 where messages can be filtered and the system can be managed for the best performance.

The invention claimed is:

1. A vehicle movement activated electrical power system comprising:
a turbine that harnesses wind currents generated by a movement of a vehicle on a road, said movement of said vehicle causing said turbine to rotate;
a generator coupled to the turbine, said generator configured to generate electricity from a rotation of the turbine;
a local electrical power network driven by the generator and extending along the road ahead of the turbine and the vehicle;
a series of electricity driven lights disposed on a corner of the road and on an intersecting road to highlight an entrance to the intersecting road;
a plurality of electrical devices connected to the local electrical power network that are activated by warning signals triggered by vehicle motion;
a warning sign that is illuminated from power from the local electrical power network and is disposed within sight of the road corner;
a battery connected to the turbine and to the local electrical power network, said battery being charged by the turbine and to provide primary or supplementary power for the local electrical power network; and
a controller connected to the local electrical power network and battery, wherein the battery, provides power to the warning sign to warn vehicles approaching the intersection that another vehicle is present, the controller includes a static data storage device and configured to control an activation state of at least one electrical device from among the plurality of electrical devices according to a look up table stored on the static data storage device of the controller, the look up table including activation information for the at least one electrical device from among the plurality of electrical devices, the activation information including at least one of a time of the day and a remaining charge level of the battery,
the series of electricity driven lights include LEDs installed at one or more edges of the road corner,
the series of electricity driven lights include LEDs that are disposed at the road corner, roadside LEDs that are disposed on a side of the road, and road arrow LEDs that are disposed in a traffic lane of the road,
when the time of the day is day time and a remaining charge level of the battery is more than a first threshold, the controller sets the road corner LEDs and the roadside LEDs to OFF and the road arrows to ON,
when the time of the day is night time and the remaining charge level of said battery is more than the first threshold, the controller sets the road corner LEDs, the roadside LEDs, and the road arrows to ON,
when the time of the day is day time and the remaining charge level of said battery is more than a second threshold and less than the first threshold, the controller sets the road corner LEDs and the roadside LEDs to OFF and the road arrows to ON,
when the time of the day is night time and the remaining charge level of said battery is more than the second threshold and less than the first threshold, the controller sets the road corner LEDs to OFF, and the roadside LEDs and the road arrows to ON,
when the time of the day is day time and the remaining charge level of said battery is more than a third threshold and less than the second threshold, the controller sets the road corner LEDs and the roadside LEDs to OFF and the road arrows to ON,
when the time of the day is night time and the remaining charge level of said battery is more than the third threshold and less than the second threshold, the controller sets the road corner LEDs and the road arrows to OFF, and the roadside LEDs to ON, and
when the remaining charge level of said battery is less than the third threshold, the controller sets the road corner LEDs, the roadside LEDs, and the road arrows to OFF.

2. The system of claim 1, further comprising:
a sensor that detects hazardous weather conditions and provides sensor inputs to the controller, the controller configured to switch illumination criteria based on the sensor input.

3. The system of claim 1, wherein
a pedal switch disposed in the road that activates a pedestrian signal to warn a pedestrian against crossing the road due to the presence of an approaching vehicle.

4. A vehicle movement activated electrical power and triggering system comprising:
a pedal disposed on a road, said pedal configured to move vertically when a vehicle passes over the pedal;
a motion conversion mechanism connected to the pedal to translate a vertical motion of the pedal into a rotational motion;
a generator coupled with the rotational motion of the motion conversion mechanism, said generator configured to generate electricity from said rotational motion;
a switch connector attached to the pedal to provide an electrical current pathway to a controller to indicate a presence of a vehicle;
a local electrical power network driven by the generator and extending along the road ahead of the pedal and the vehicle;
a plurality of electrical devices connected to the local electrical power network and disposed along or adjacent to the road to provide a warning of oncoming traffic;
a plurality of electrical devices connected to the local electrical power network and disposed along or adjacent to the road to warn pedestrians of oncoming traffic;
a battery connected to the turbine and to the local electrical power network, said battery being charged by the turbine and to provide primary or supplementary power for the local electrical power network; and
a controller connected to said local electrical power network, said battery, and at least one electrical device from among the plurality of electrical devices, said controller including a static data storage device and configured to control an activation state of at least one electrical device from among the plurality of electrical devices according to a look up table stored on said static data storage device of said controller, said look up table including activation information for at least one electrical device from among the plurality of electrical devices, said activation information including at least one of a time of the day and a remaining charge level of said battery, the plurality of electrical devices includes at least one road corner LED disposed on, in or next to a road corner, at least one roadside light disposed on, in or next to the road and illuminating road arrows disposed in or on the road, during a predetermined hazardous weather condition, when the time of the day is day time and the remaining charge level of said battery is more than a first threshold, the controller sets at least one road corner LED, the illuminating road arrows and at least one roadside LED to ON;

when the time of the day is night time and the remaining charge level of said battery is more than the first threshold, the controller sets the road corner LEDs, the illuminating road arrows, and the Roadside LEDs to ON;

when the time of the day is day time and the remaining charge level of said battery is more than a second threshold and less than the first threshold, the controller sets the road corner LEDs to OFF and the roadside LEDs and the illuminating road arrows to ON;

when the time of the day is night time and the remaining charge level of said battery is more than the second threshold and less than the first threshold, the controller sets the road corner LEDs, the roadside LEDs and the illuminating road arrows to ON;

when the time of the day is day time and the remaining charge level of said battery is more than a third threshold and less than the second threshold, the controller sets the road corner LEDs and the roadside LEDs to OFF and the illuminating road arrows to ON;

when the time of the day is night time and the remaining charge level of said battery is more than the third threshold and less than the second threshold, the controller sets the road corner LEDs to OFF and the roadside LEDs and the illuminating road arrows to ON; and when the time of the day is day time and the remaining charge level of said battery is less than the third threshold, the controller sets the road corner LEDs, the roadside LEDs, and the illuminating road arrows to OFF; and when the time of the day is night time and the remaining charge level of said battery is less than the third threshold, the controller sets the road corner LEDs to OFF and the roadside LEDs and the illuminating road arrows to ON.

5. The system of claim 4, further comprising
a crossroad signal light imbedded in the road that provides at least one of a visual warning and a wireless warning signal if another vehicle is detected as approaching an intersection of the road and an intersecting road.

6. A vehicle movement activated electrical power and triggering system comprising:
a pedal disposed on a road, said pedal configured to move vertically when a vehicle passes over the pedal;
a motion conversion mechanism connected to the pedal to translate a vertical motion of the pedal into a rotational motion;
a generator coupled with the rotational motion of the motion conversion mechanism, said generator configured to generate electricity from said rotational motion;
a switch connector attached to the pedal to provide an electrical current pathway to a controller to indicate a presence of a vehicle;
a local electrical power network driven by the generator and extending along the road ahead of the pedal and the vehicle;

a plurality of electrical devices connected to the local electrical power network and disposed along or adjacent to the road to provide a warning of oncoming traffic;
a plurality of electrical devices connected to the local electrical power network and disposed along or adjacent to the road to warn pedestrians of oncoming traffic;
a battery connected to the turbine and to the local electrical power network, said battery being charged by the turbine and to provide primary or supplementary power for the local electrical power network; and
a controller connected to said local electrical power network, said battery, and at least one electrical device from among the plurality of electrical devices, said controller including a static data storage device and configured to control an activation state of at least one electrical device from among the plurality of electrical devices according to a look up table stored on said static data storage device of said controller, said look up table including activation information for at least one electrical device from among the plurality of electrical devices, said activation information including at least one of a time of the day and a remaining charge level of said battery, the plurality of electrical devices includes at least one road corner LED disposed on, in or next to a road corner, at least one roadside light disposed on, in or next to the road and illuminating road arrows disposed in or on the road, when the time of the day is day time and the remaining charge level of said battery is more than a first threshold, the controller sets a road corner LEDs, illuminating road arrows and Roadside LEDs to ON;

when the time of the day is night time and the remaining charge level of said battery is more than the first threshold, the controller sets the road corner LEDs, the illuminating road arrows, and the Roadside LEDs to ON;

when the time of the day is day time and the remaining charge level of said battery is more than a second threshold and less than the first threshold, the controller sets the road corner LEDs to OFF and the roadside LEDs and the illuminating road arrows to ON;

when the time of the day is night time and the remaining charge level of said battery is more than the second threshold and less than the first threshold, the controller sets the road corner LEDs, the roadside LEDs and the illuminating road arrows to ON;

when the time of the day is day time and the remaining charge level of said battery is more than a third threshold and less than the second threshold, the controller sets the road corner LEDs and the roadside LEDs to OFF and the illuminating road arrows to ON;

when the time of the day is night time and the remaining charge level of said battery is more than the third threshold and less than the second threshold, the controller sets the road corner LEDs to OFF and the roadside LEDs and the illuminating road arrows to ON; and when the time of the day is day time and the remaining charge level of said battery is less than the third threshold, the controller sets the road corner LEDs, the roadside LEDs, and the illuminating road arrows to OFF; and when the time of the day is night time and the remaining charge level of said battery is less than the third threshold, the controller sets the road corner LEDs to OFF and the roadside LEDs and the illuminating road arrows to ON.

7. The system of claim 4, wherein
the plurality of electrical devices includes at least one road corner LED disposed on, in or next to a road corner, at least one roadside light disposed on, in or next to the road and illuminating road arrows disposed in or on the road, when a speed of an oncoming vehicle is between 0 and 40 miles per hour and a weather temperature is between 50 and 90 degrees Fahrenheit and a fog level is below 30%, the controller causes a sign to illuminate and display the speed of the oncoming vehicle in a yellow color at a fixed brightness, when either the speed of the oncoming vehicle is between 40 and 50 miles per hour or the temperature is either between 30 and 50 or 90 and 100 degrees Fahrenheit or the fog level is between 30% and 50%, then the sign will illuminate and display the speed of the oncoming vehicle in a yellow color and will flash on and off, when either the speed of the oncoming vehicle is between 50 and 60 miles per hour or the temperature is either between 10 and 30 or 100 and 110 degrees Fahrenheit or the fog level is between 50% and 70%, then the sign will illuminate and display the speed of the oncoming vehicle in an orange color and will flash on and off, and when either the speed of the oncoming vehicle is above 60 miles per hour or the temperature is either above 110 or below 10 degrees Fahrenheit or the fog level is above 70%, then the sign will illuminate and display the speed of the oncoming vehicle in a red color and will flash on and off.

* * * * *